United States Patent
Decome

(10) Patent No.: US 6,382,695 B1
(45) Date of Patent: May 7, 2002

(54) HOLLOW ELONGATED SUPPORT STRUCTURE COMPRISING A TRANSVERSE FLANGE AT EACH OF ITS ENDS

(75) Inventor: Stéphane Decome, Aulnoye-Aymeries (FR)

(73) Assignee: Vallourec Composants Automobiles Hautmont, Hautmont (FR)

( * ) Notice: Subject to any disclaimer, the term of this patent is extended or adjusted under 35 U.S.C. 154(b) by 0 days.

(21) Appl. No.: 09/787,535

(22) PCT Filed: Sep. 16, 1999

(86) PCT No.: PCT/FR99/02210

§ 371 Date: Mar. 20, 2001

§ 102(e) Date: Mar. 20, 2001

(87) PCT Pub. No.: WO00/17034

PCT Pub. Date: Mar. 30, 2000

(30) Foreign Application Priority Data

Sep. 21, 1998 (FR) .......................................... 98 11749

(51) Int. Cl.[7] .............................................. B62D 25/14
(52) U.S. Cl. ...................... 296/70; 256/72; 256/203.62; 256/194; 256/187
(58) Field of Search .......................... 296/203.02, 194, 296/170, 72, 187, 146.6; 52/731, 793.1

(56) References Cited

U.S. PATENT DOCUMENTS

| | | | |
|---|---|---|---|
| 4,708,390 A | * 11/1987 | Palentyn et al. ............. 296/188 |
| 4,863,214 A | 9/1989 | Kranis, Jr. | |
| 4,899,843 A | * 2/1990 | Takano et al. ............... 296/194 |
| 5,273,310 A | * 12/1993 | Terai ............................ 296/70 |
| 5,282,637 A | * 2/1994 | McCreadie ................. 296/194 |
| 5,411,311 A | * 5/1995 | Shimmell et al. ........... 296/194 |
| 5,676,216 A | * 10/1997 | Palma et al. .................. 296/70 |
| 5,755,486 A | 5/1998 | Wycech | |
| 5,868,426 A | * 2/1999 | Edwards et al. ............... 296/70 |
| 5,992,925 A | * 11/1999 | Alberici ................. 296/203.02 |
| 6,110,037 A | * 8/2000 | Yoshinaka .................... 296/70 |
| 6,176,544 B1 | * 1/2001 | Seksaria et al. ....... 296/203.02 |
| 6,276,740 B1 | * 8/2001 | Mellor et al. ................. 296/72 |
| 6,315,347 B1 | * 11/2001 | Gotz ........................... 296/72 |
| 2001/0033094 A1 | * 10/2001 | Sano et al. ................. 296/189 |

FOREIGN PATENT DOCUMENTS

| | | | |
|---|---|---|---|
| DE | 4224303 | * | 1/1994 |
| FR | 2 757 473 | | 6/1998 |
| GB | 2 067 478 | | 7/1981 |

* cited by examiner

*Primary Examiner*—Ken Patel
(74) *Attorney, Agent, or Firm*—Young & Thompson

(57) ABSTRACT

A hollow elongated support structure designed in particular to support a motor vehicle fittings located at right angle with the instrument panel, the ends of the structure (10) including an end flange (100) arranged transversely for fixing and/or maintaining the instrument panel itself, and/or for fixing the hollow support structure (10) to the vehicle body: each end flange (100) is integral with a plastic end cap (20, 30) inserted into the support structure (10), at the ends thereof with which it is integral.

21 Claims, 4 Drawing Sheets

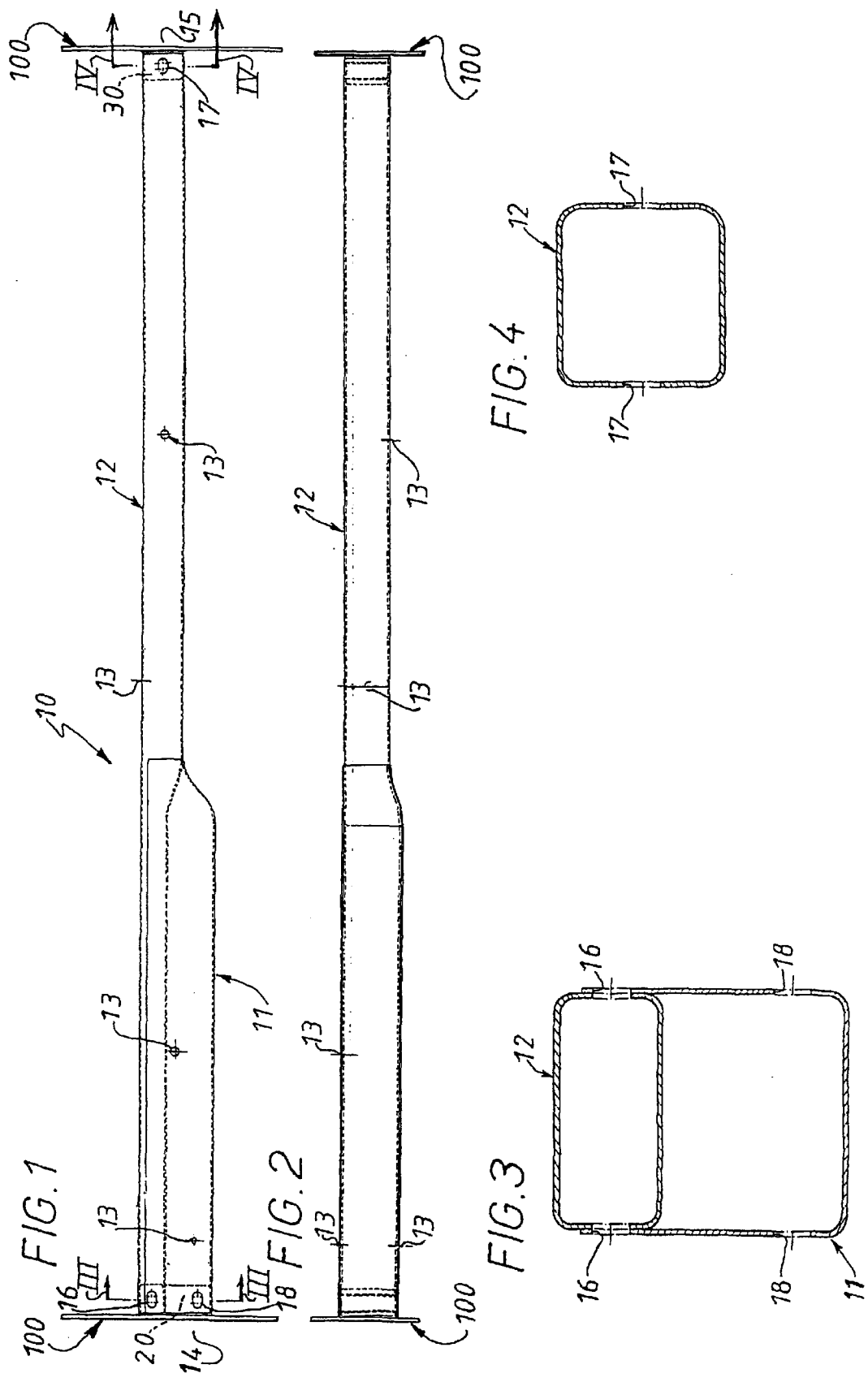

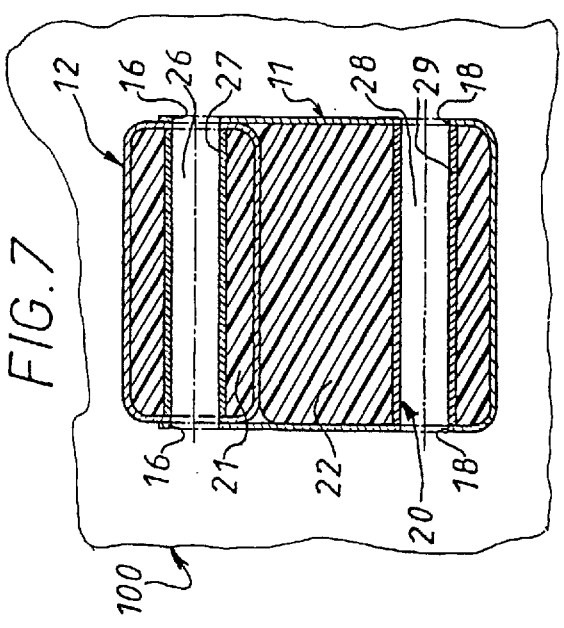
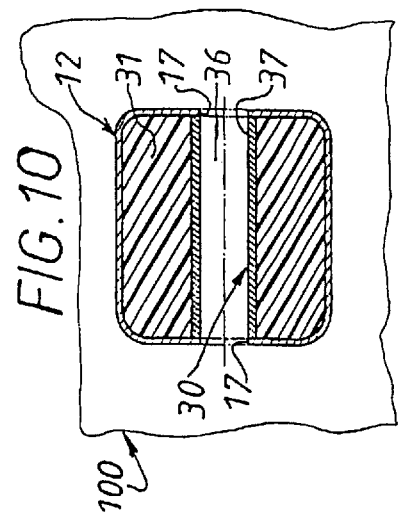
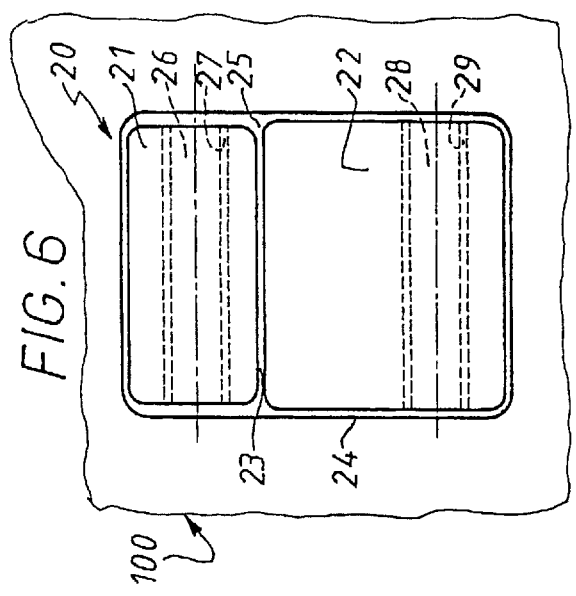
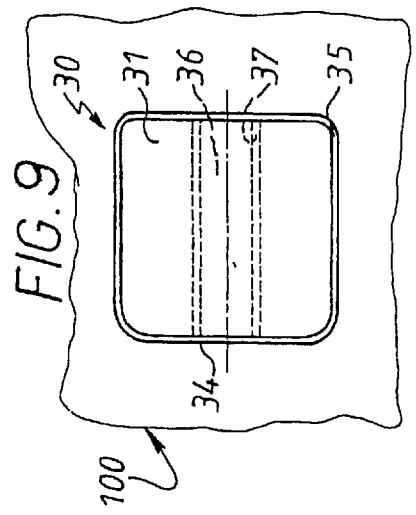
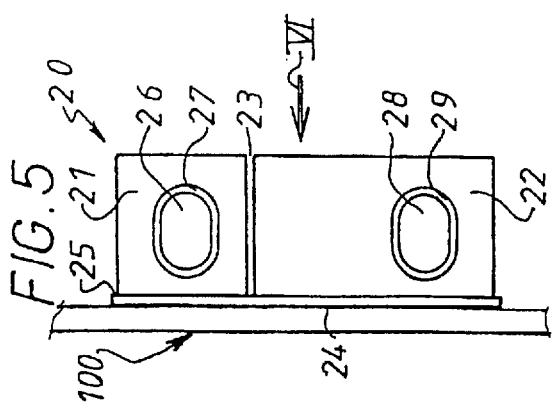
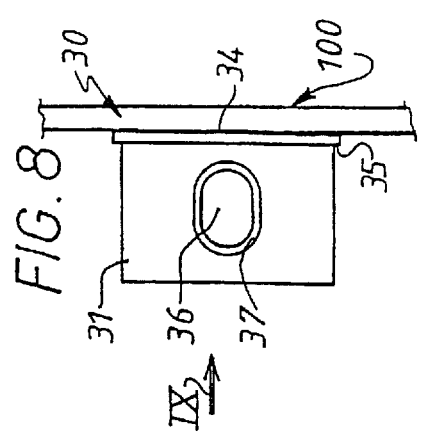

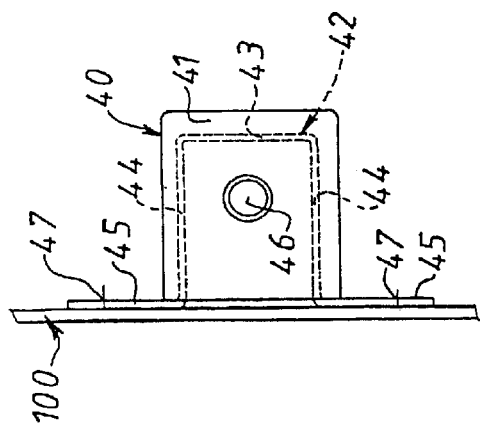
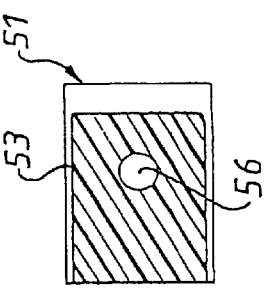
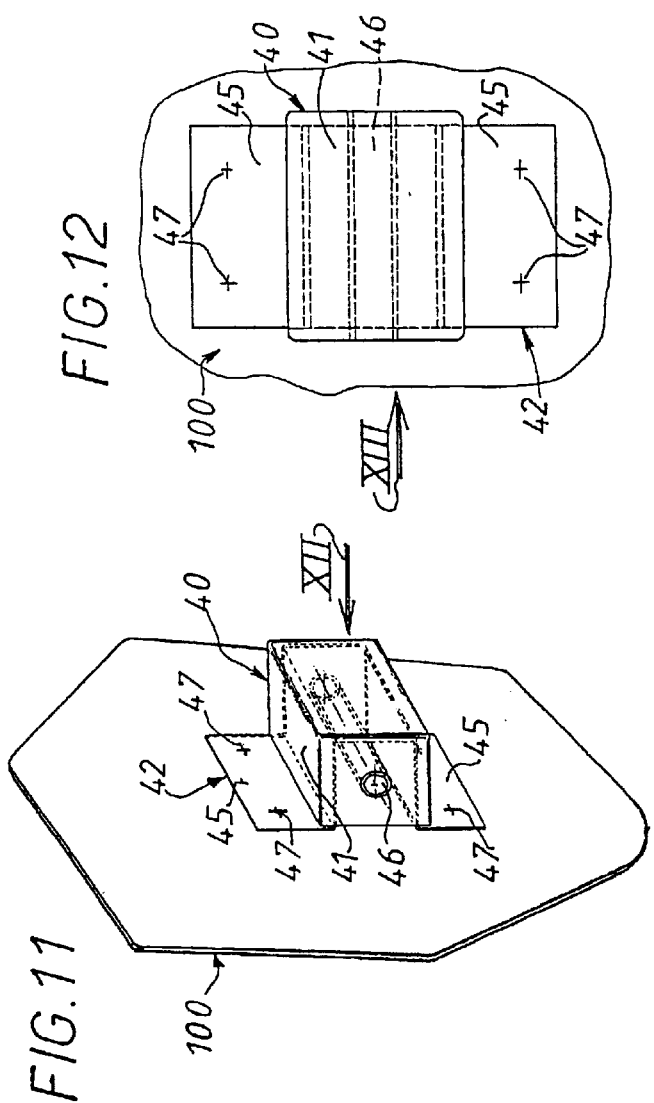
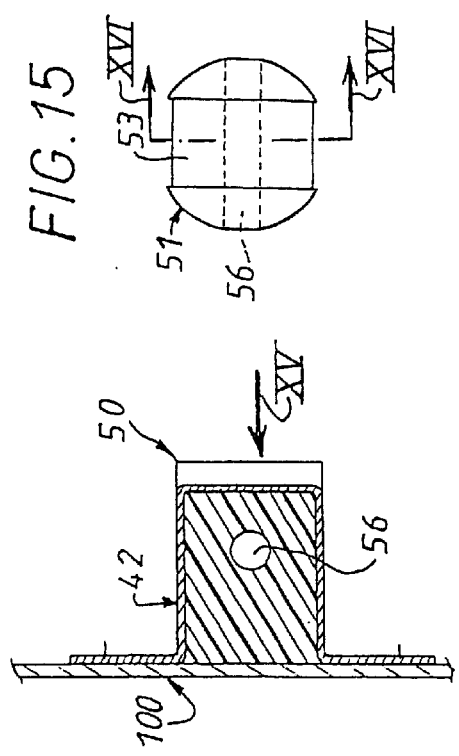

HOLLOW ELONGATED SUPPORT STRUCTURE COMPRISING A TRANSVERSE FLANGE AT EACH OF ITS ENDS

CROSS REFERENCE TO RELATED APPLICATION

This is the national stage of International Application PCT/FR99/02210 filed on Sep. 16, 1999, which designated the United States of America.

FIELD OF THE INVENTION

The present invention relates to an elongate hollow support structure intended in particular to support the equipment units in the vicinity of the dashboard of an automobile vehicle.

BACKGROUND OF THE INVENTION

This kind of support structure is well known in the art; usually referred to as a crossmember, it is made of metal and disposed transversely to the longitudinal axis of the vehicle at the front end of the passenger compartment and supports equipment units such as the dashboard itself, the steering column, the heater or air-conditioner, the air bag(s) and other equipment.

The crossmember is generally fixed to the frame of the body of the vehicle near its ends. To this end, members are attached, in particular welded, to its ends, as described in the document EP-A-694 465, U.S. Pat. No. 4,826,235 or U.S. Pat. No. 5,387,023, for example. This method is costly.

It has also been proposed to fasten to each end of the beam structure a transverse flange for fixing and/or retaining the dashboard itself, the contour of said flanges matching the section of the dashboard or even its trim.

Until now the above kind of flanges have been welded to the support structure. Apart from the fact that this operation is difficult and costly, it does not facilitate storing or transporting structures equipped in this way to the place where the vehicles are assembled, especially as said flanges can be large; moreover, they are fragile and can be deformed during storage or transportation.

SUMMARY OF THE INVENTION

The present invention provides an elongate hollow support structure intended in particular to support the equipment units of an automobile vehicle in the vicinity of its dashboard, the ends of said structure including a transverse end flange for fixing and/or retaining the dashboard itself and/or for fixing the hollow support structure to the body of the vehicle, said support structure having a lower unit cost than prior art support structures.

According to the invention, a support structure of the above kind is characterized in that each end flange is fastened to a plastics material plug inserted into said support structure, to the ends of which it is fastened.

The plug advantageously includes a baseplate from which protrudes a block, said baseplate projecting relative to the block to define a peripheral transverse rim.

If the section of the structure delimits a plurality of closed spaces, a plurality of blocks preferably protrude from the baseplate and each of said blocks is adapted to be mounted in one of said spaces.

The plug is advantageously adapted to be force-fitted into said structure.

If the structure includes transversely facing openings for fixing members for fixing the structure to the body or the plug to the structure, to pass through then the plug has a passage through it aligned with said openings.

The openings and the passage preferably have an oblong section.

The passage is advantageously bordered by a metal tube.

The plug is preferably molded over the metal tube.

The inside surface of one or both ends of the hollow support structure adapted to receive a plug is preferably provided with means for facilitating aligning the passage(s) with said openings.

The inside surface of the ends of the structure is advantageously not a surface of revolution.

The inside surface of one or both ends of the hollow support structure is preferably a surface of revolution and has a notch at the end adapted to cooperate with a raised portion on the outside surface of the plug(s).

The plug is advantageously fastened to the end flange by means of a bracket having rims attached, for example welded, to the end flange.

The plug is preferably a block which has a groove in which the bracket locates, straddling the block.

The plug is advantageously a block molded onto the bracket.

The bracket is advantageously generally U-shaped and the passage in the plug is advantageously parallel to the flanges of the bracket.

The bracket is advantageously generally U-shaped and the passage in the plug is advantageously perpendicular to the flanges of the bracket which are advantageously provided with openings aligned with the end of the passage.

Alternatively, the end flange has an anchorage over which the plug is molded; the anchorage is obtained by cutting and pressing; the anchorage is obtained by cutting and bending lugs.

The openings of the structure are advantageously obtained by hydroforming and the block advantageously has a lateral notch for avoiding a tongue resulting from hydroforming when mounting the plug in the structure.

To explain the purpose of the invention better, embodiments of the invention shown in the appended drawings by way of purely illustrative and non-limiting example will now be described.

BRIEF DESCRIPTION OF THE DRAWINGS

In the drawings:

FIG. 1 is an elevation view of a support structure according to the invention;

FIG. 2 is a plan view of the support structure from FIG. 1;

FIG. 3 is a view of the support structure without its flanges in section taken along the line III—III in FIG. 1;

FIG. 4 is a view of the support structure without its flanges in section taken along the line IV—IV in FIG. 1;

FIG. 5 is a partial elevation view of a flange included in the support structure shown in FIGS. 1 to 4 and equipped with a plug;

FIG. 6 is a view in the direction of the arrow VI in FIG. 5;

FIG. 7 is a view in section taken along the line III—III in FIG. 1;

FIG. 8 is a partial elevation view of a flange included in the support structure from FIGS. 1 to 4 and equipped with a different plug;

FIG. 9 is a view in the direction of the arrow IX in FIG. 8,

FIG. 10 is a view in section taken along the line IV—IV in FIG. 1;

FIG. 11 is a perspective view of an end flange equipped with a different plug;

FIG. 12 is a partial plan view of the plug in the direction of the arrow XII in FIG. 11 and to a larger scale;

FIG. 13 is a view in the direction of the arrow XIII in FIG. 12;

FIG. 14 is a part-sectional view showing a different embodiment of the plug shown in FIGS. 11 to 13;

FIG. 15 is a view in the direction of the arrow XV in FIG. 14 showing only the block;

FIG. 16 is a view in section taken along the line XVI—XVI in FIG. 15;

DETAILED DESCRIPTION OF THE INVENTION

Figure 18:
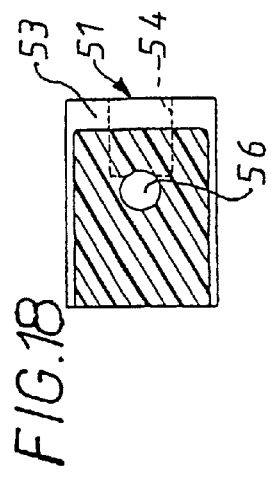
FIGS. 17 and 18 are analogous to FIGS. 15 and 16 and show a different embodiment of the invention.

FIGS. 1 to 4 show a support structure 10 obtained by assembling a globally rectangular section tube 12 extending the entire length of the structure from its driver end 14 to its passenger end 15; starting from the driver end 14 of the structure 10, and over almost half the length of the structure 10, the tube 12 has a rectangular section with rounded edges; beyond a connection area, and as far as the passenger end 15, its section is larger and practically square. A tube of the above kind is conveniently obtained by hydroforming a cylindrical tube to a constant perimeter. A hydroforming process of the above kind is described in the document EP-A-0 294 034 in particular.

At the driver end 14, a U-shaped beam 11 is welded to the tube 12, which is partly engaged between the flanges of the U-shape of the U-shaped beam 11, which extends from the driver end 14 along the smaller section part of the tube 13 and is then joined to its larger section part, whose section is nevertheless smaller than that surrounded by the beam 11. This produces a support structure 10 of high inertia, including in the area near the driver end which supports the steering column. The reference numbers 13 indicate locations for fixing equipment units in the vicinity of the dashboard; they are generally plain or threaded holes with or without a flange.

The support structure 10 has at each end one or more pairs of facing transverse openings to accommodate fixing members such as bolts for fixing the support structure 10 to the frame of the body of the vehicle; two pairs of openings are provided at the driver end 14, one pair of openings 16 in the walls of the beam 11 and the tube 12 and one pair of openings 18 in the walls of the beam 11 only; a single pair of openings 17 is provided at the passenger end 15; all the above openings are preferably oblong to allow for variations in the dimensions of the body.

The support structure 10 according to the invention has a flange 100 at each end fitted with a plastics material plug.

FIGS. 5 and 6 show only the plug for the driver end 14 of the support structure 10; the plug 20 has a plane baseplate 24 from which emerge two blocks 21 and 22 separated by a gap 23.

Each block 21, 22 has a respective passage 26, 28 through it whose section corresponds to that of the openings 16, 18; each passage 26, 28 is bordered by an oblong metal tube 27, 29 around which the blocks 21 and 22 are molded. The block 21 is adapted to be force-fitted into the tube 12 and the block 22 is adapted to be force-fitted into the closed space of the beam 11 delimited by the tube 12; forming bosses (not shown) on the peripheral surfaces of the blocks 21, 22 enables the peripheral surfaces of the blocks 21, 22 to deform slightly to accommodate variations in the dimensions of the blocks; the length of the oblong tube 27 corresponds to the distance between the inside walls of the tube 12 defining the openings 16 and the length of the oblong tube 29 corresponds to the distance between the inside walls of the flanges of the U-shaped beam 11; the two blocks 21, 22 naturally share the baseplate 24, which joins them together, the whole being molded in one piece; the width of the gap 23 corresponds to the thickness of the wall of the tube 12 inside the beam 11, which it is adapted to receive. The baseplate 24 projects relative to the blocks 21, 22 to define a peripheral transverse rim 25.

Accordingly, it will be clear that when the plug is force-fitted into the beam structure 10 it is fastened to it and forms an integral part of said structure, requiring neither gluing nor welding; as shown in FIG. 7, when it is in place the passages 26, 28 are perfectly aligned with the respective transversely facing opening 16, 18 and the plug 20 is positioned in the support structure 10 by coming into abutting engagement against the edge of the rim 25 defined around the blocks 21, 22 by the baseplate 24 at the end of the support structure 10; note that the ends of the oblong tubes 27, 29 are then in line with, and virtually in contact with, the walls of the tube 12 and the beam 11 incorporating the openings: the oblong tubes 27, 29 act as spacers preventing these walls from buckling on tightening up the fixing members for the support structure 10 that pass through the passages 26, 28; thanks to the invention, the oblong tubes are perfectly positioned, in an economical manner, without it being necessary to use a template; also, the passages 26, 28 guide the fixing members when the support structure 10 is mounted on the frame of the body.

FIGS. 8 to 10 are respectively analogous to FIGS. 5 to 7 that have just been described, but show the plug 30 at the passenger end 15 of the support structure 10; unchanged relative to the plug 20 in all other respects, the plug 30 comprises only one plastics material block 31 upstanding from a baseplate 34 defining a rim 35 around it and only one passage 36 bordered by an oblong tube 37; the block 31 matches the section of the tube 12 at the passenger end 15.

In the embodiments that have just been described the passages 26, 28, 36 are bordered by respective oblong tubes 27, 29, 37; in an embodiment which is not shown the oblong tubes are dispensed with; the plastics material of the plugs can be polypropylene, polyvinyl chloride or polyethylene.

The plugs described hereinabove are connected to the end flanges 100 by any appropriate means.

In FIGS. 11 to 13 the plug 40, which has a circular section passage 46 through it, consists of a block 41 of plastics material molded over a generally U-shaped metal bracket 42 having a core 43 and two flanges 44 embedded in the block 41; the flanges 44 of the bracket 42 are extended externally of the block 41 by coplanar rims 45 parallel to the core 43 and extending in opposite directions; the plug 40 is fixed to the flange 100 by means of the rims 45, for example by spot welds 47.

Accordingly, the plug 40 equipped with the flange 100 can be inserted into the support structure 10 on the vehicle assembly line just before the structure is fixed to the frame of the body and the drawbacks referred to hereinabove are avoided.

FIGS. 14, 15 and 16 show a plug 50 analogous to the plug 40 described hereinabove but in which the bracket 42 does not have the plastics material block 51 molded over it; the block has at the periphery of three of its sides a groove 53 whose width corresponds to that of the bracket 42; the U-shape of the bracket 42 fits in the groove 43, thereby straddling the block 51, and the bracket is then fixed to the flange 100; the block 51 is retained laterally by means of the groove 53; note also that the cross section of the plastics material block 51 is globally circular, the plug being designed to be fitted to a tubular section support structure 10; thus the invention applies to any kind of structure, regardless of its section.

In the embodiments described with reference to FIGS. 11 to 16, the passage 46 or 56 is parallel to the flanges of the bracket 53; in a different embodiment, not shown, the passage is perpendicular to the flanges of the bracket, i.e. parallel to the core of said bracket, and in this case the flanges of the bracket incorporate openings aligned with the ends of the passage 46, 56.

Figure 17:
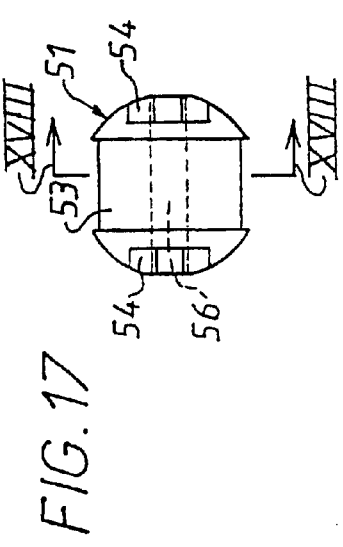

Support structures like the support structure 10 can be obtained by hydroforming; the hydroforming process can also be used to form the openings 16, 17 or 18: in this case, as is known in the art, the material displaced to form the openings is not separated from the structure but remains attached to it on the inside like a tongue and perpendicular to the wall in which the corresponding opening is formed; in this case it is advantageous to provide in the plastics material block a lateral notch 54 (see FIGS. 17 and 18) to avoid these tongues during mounting of the plug in the support structure.

Figure 19:
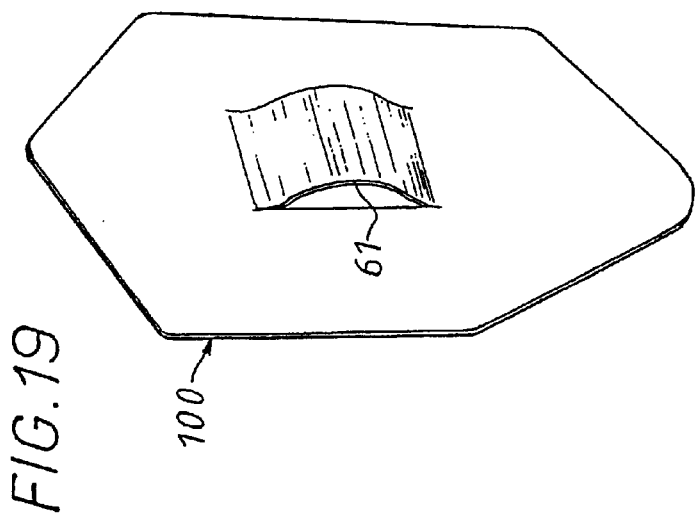

FIG. 19 shows an end flange 100 in which an anchorage 61 has been formed by cutting and stamping and over which the plastics material block has been molded, avoiding the need to use a bracket.

Figure 20:
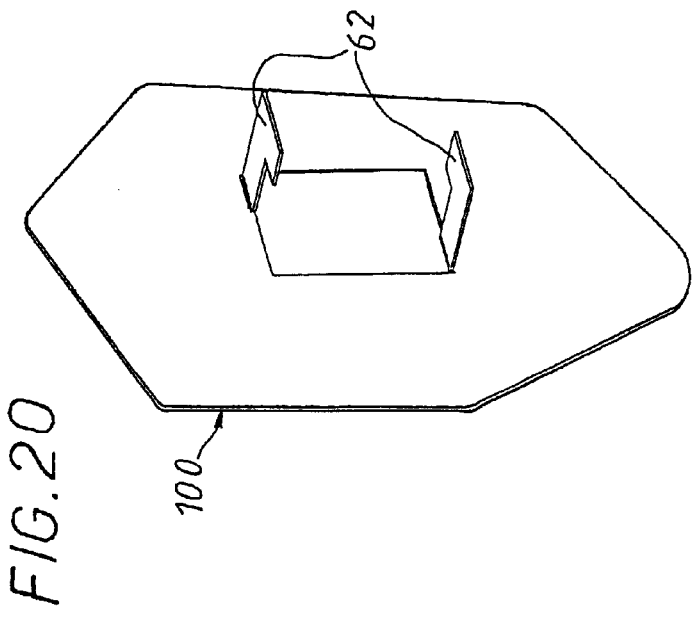
FIGS. 19 and 20 each show in perspective one embodiment of an end flange provided with an anchorage adapted to have a block of plastics material molded over it.

FIG. 20 shows an anchorage for the fastening material block which is formed by two lugs 62 cut and bent out from the flange 100.

In all the foregoing, the plugs are advantageously force-fitted into the ends of the support structure; similar results are obtained simply by inserting the plugs into the ends of the support structure and retaining them there temporarily using retaining means such as screws, pins or other such means, final fastening together of the plug and the structure being achieved by fixing the structure to the frame of the body; of course, in this case, the plugs and support structure are adapted to receive said retaining means.

What is claimed is:

1. An elongate hollow support structure for supporting the equipment units of an automobile vehicle in the vicinity of its dashboard, said structure having ends which include a transverse end flange for fixing or retaining the dashboard itself or for fixing the hollow support structure to the body of the vehicle; wherein each end flange is fastened to a plastic material plug inserted into said support structure, to the ends thereof with which it is fastened.

2. The structure according to claim 1, wherein the plug includes a baseplate from which protrudes a block; said baseplate projecting relative to the block to define a peripheral transverse rim.

3. The structure according to claim 2, wherein the section of said structure delimits a plurality of closed spaces, a plurality of blocks protrude from the baseplate, and each of said blocks is structured and arranged to be mounted in one of said spaces.

4. The structure according to claim 1, wherein the plug is structured and arranged to be force-fitted into said structure.

5. The structure according to claim 1, wherein said structure includes transversely racing openings for fixing members to pass through, and said plug has a passage therethrough aligned with said openings.

6. The structure according to claim 5, wherein the openings and the passage have an oblong section.

7. The structure according to claim 5, wherein the passage is bordered by a metal tube.

8. The structure according to claim 7, wherein the plug is molded over the metal tube.

9. The structure according to claim 5, wherein the inside surface of one or both ends of the hollow support structure structured and arranged to receive a plug is provided with means for facilitating aligning the passage with said openings.

10. The structure according to claim 9, wherein the inside surface of the ends of the structure is not a surface of revolution.

11. The structure according to claim 9, wherein the inside surface of one or both ends of the hollow support structure is a surface of revolution and has a notch at the end structured and arranged to cooperate with a raised portion on the outside surface of the plug.

12. The structure according to claim 5, wherein the plug is fastened to the end flange by a bracket having rims attached to the end flange.

13. The structure according to claim 12, wherein the plug is a block which has a groove in which the bracket fits, straddling the block.

14. The structure according to claim 12, wherein the plug is a block molded onto the bracket.

15. The structure according to claim 12, wherein the bracket is generally U-shaped and the passage in the plug is parallel to flanges of the bracket.

16. The structure according to claim 12, wherein the bracket is generally U-shaped and the passage in the plug is perpendicular to flanges of the bracket which are provided with openings aligned with the end of the passage.

17. The structure according to claim 1, wherein the end flange has an anchorage over which the plug is molded.

18. The structure according to claim 17, wherein the anchorage is obtained by cutting and pressing.

19. The structure according to claim 17, wherein the anchorage is obtained by cutting and bending lugs.

20. The structure according to claim 13, wherein the plug comprises a block and the openings of the structure are obtained by hydroforming, and the block has a lateral notch for avoiding a tongue resulting from hydroforming when mounting the plug in the structure.

21. The structure according to claim 1, wherein the plug is fastened to the end flange by a bracket having rims attached to the end flange.

* * * * *